(12) United States Patent
Yokoyama

(10) Patent No.: US 7,761,908 B2
(45) Date of Patent: Jul. 20, 2010

(54) NETWORK APPARATUS

(75) Inventor: Akira Yokoyama, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1177 days.

(21) Appl. No.: 11/167,035

(22) Filed: Jun. 24, 2005

(65) Prior Publication Data

US 2005/0289656 A1 Dec. 29, 2005

(30) Foreign Application Priority Data

Jun. 25, 2004 (JP) ............................. 2004-187794
Jun. 2, 2005 (JP) ............................. 2005-162295

(51) Int. Cl.
*G06F 7/04* (2006.01)
(52) U.S. Cl. ..................... 726/4; 709/220; 709/223
(58) Field of Classification Search .................. 726/4; 709/220–225
See application file for complete search history.

(56) References Cited

U.S. PATENT DOCUMENTS

| | | | | |
|---|---|---|---|---|
| 4,264,782 A | * | 4/1981 | Konheim | 705/75 |
| 6,052,468 A | * | 4/2000 | Hillhouse | 380/281 |
| 6,076,166 A | * | 6/2000 | Moshfeghi et al. | 726/4 |
| 6,353,891 B1 | * | 3/2002 | Borella et al. | 726/12 |
| 6,826,692 B1 | * | 11/2004 | White | 726/8 |
| 2002/0010679 A1 | * | 1/2002 | Felsher | 705/51 |
| 2002/0087894 A1 | * | 7/2002 | Foley et al. | 713/202 |
| 2003/0046238 A1 | * | 3/2003 | Nonaka et al. | 705/51 |
| 2003/0135507 A1 | * | 7/2003 | Hind et al. | 707/100 |

FOREIGN PATENT DOCUMENTS

| | | |
|---|---|---|
| JP | 10-149270 | 6/1998 |
| JP | 2001-1097154 | 4/2001 |
| JP | 2002-495572 | 2/2002 |
| JP | 2003-330668 | 11/2003 |
| JP | 2004-5409 | 1/2004 |

OTHER PUBLICATIONS

Linksys "Instant Broadband Series Cable/DSL Router" Manual, 2002.*
U.S. Appl. No. 11/042,789 of Akira Yokoyama, filed Jan. 24, 2005.

* cited by examiner

*Primary Examiner*—Kimyen Vu
*Assistant Examiner*—John B King
(74) *Attorney, Agent, or Firm*—Cooper & Dunham LLP

(57) ABSTRACT

Exemplary embodiments of the present application provide an apparatus, system, method, computer program and product, each capable of authenticating a client, generating client device management data corresponding to the authenticated client in a predetermined XML-based format, and providing the client device management data to the authenticated client.

23 Claims, 11 Drawing Sheets

FIG. 5

| | | |
|---|---|---|
| DEVICE MANAGEMENT DATA (106a) | DEVICE SETTING DATA | IDENTIFICATION DATA |
| | | HEADER DATA |
| | | READ SETTING DATA |
| | | PRINT SETTING DATA |
| | | AUTHENTICATION TYPE DATA |
| | | |
| | DEVICE STATUS DATA | TONER DATA |
| | | MEMORY DATA |
| | | SHEET DATA |
| | | PRINTED PAGE DATA |
| | | |

DEVICE LOG DATA

| JOB NUMBER | JOB TYPE | USER ID | LOG FILE NUMBER |
|---|---|---|---|
| 0000 | PRINTER | 0001 | 0 |
| 0001 | FAX | 0004 | 1 |
| 0002 | FAX | -------- | 2 |
| 0004 | COPIER | 0002 | 3 |
| 0005 | COPIER | −1 | 4 |
| : | : | : | : |

| USER ID | USER AUTHENTICATION | | AUTHORIZED FUNCTION | AUTHORIZED DATA TYPE |
|---|---|---|---|---|
| | USER NAME | PASSWORD | | |
| 0000 | admin | 7584 | NONE | ALL DEVICE LOG DATA<br>ALL DEVICE SETTING DATA<br>ALL DEVICE STATUS DATA |
| 0001 | kimura | 1234 | COPIER, PRINTER | USER'S DEVICE LOG DATA<br>COPIER/PRINTER DEVICE STATUS DATA |
| 0002 | tanaka | 4321 | COPIER | USER'S DEVICE LOG DATA<br>COPIER DEVICE STATUS DATA |
| 0003 | yamada | 2233 | PRINTER | USER'S DEVICE LOG DATA<br>PRINTER DEVICE STATUS DATA |
| 0004 | itou | 5566 | ALL | USER'S DEVICE LOG DATA<br>ALL DEVICE STATUS DATA |
| 0005 | nakata | 7256 | COPIER, PRINTER | USER'S DEVICE LOG DATA<br>COPIER/PRINTER DEVICE STATUS DATA |
| .. | .. | .. | .. | .. |

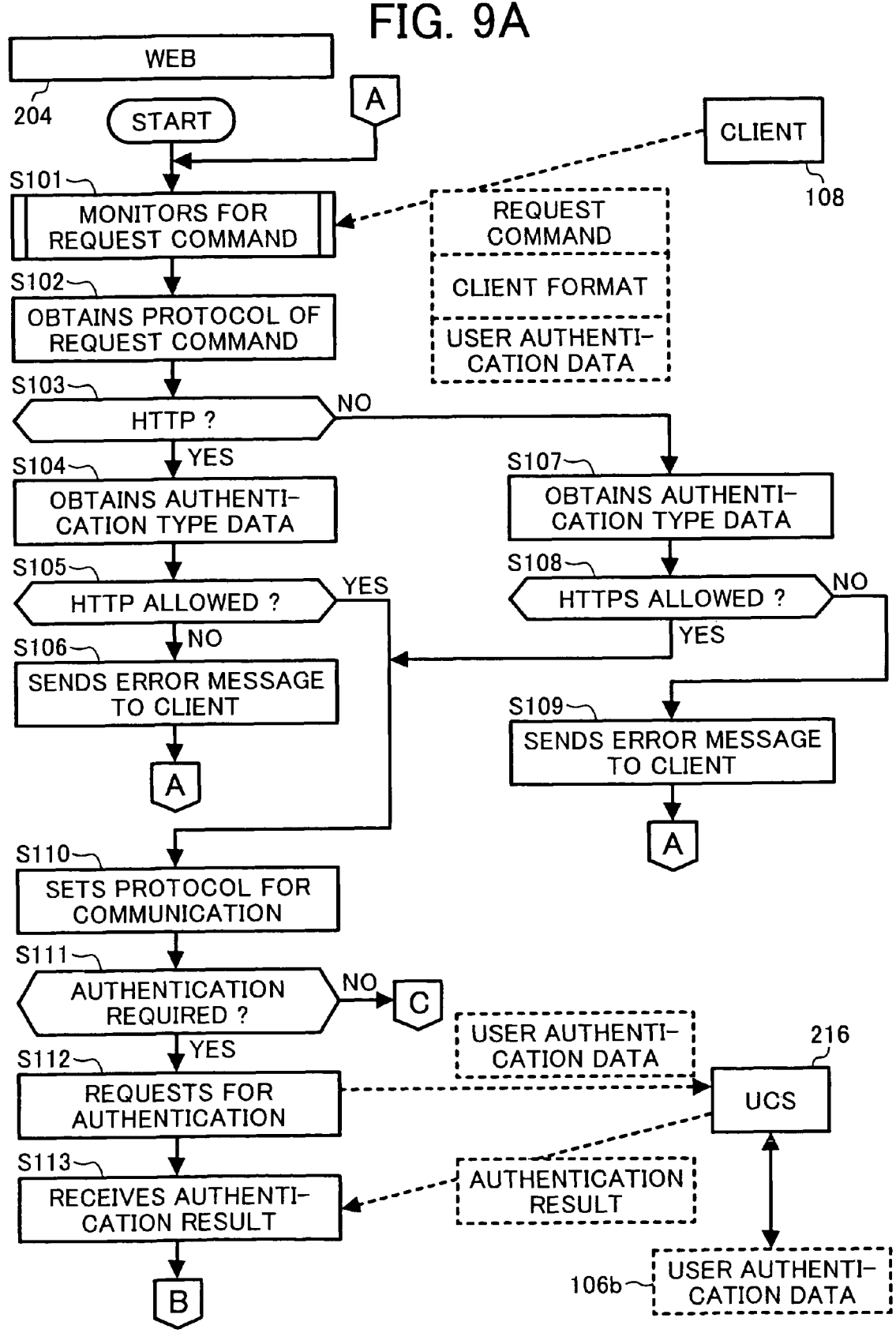

NETWORK APPARATUS

FIELD

The following disclosure generally relates to a network apparatus capable of sending or receiving data via a network.

DISCUSSION OF THE BACKGROUND

To manage various devices on a network, a network apparatus may be provided, which can generate device management data. An administrator or a general user of the network apparatus may obtain the device management data from the network apparatus at any time.

However, the device management data may sometimes include information that should be only accessible by the administrator, or information that should be only accessible by a particular user.

SUMMARY

One exemplary embodiment of the present application provides an apparatus, system, method, computer program and product, each capable of authenticating a client, generating client device management data corresponding to the authenticated client in a predetermined XML-based format, and providing the client device management data to the authenticated client.

Another exemplary embodiment of the present application provides an apparatus, system, method, computer program and product, each capable of authenticating a client, generating client device management data corresponding to the authenticated client in a predetermined XML-based format, converting the client device management data from the predetermined XML-based format to a client format readable to the authenticated client, and providing the converted client device management data to the authenticated client.

In addition to the above-described embodiments, the present application may be implemented in other ways, within the scope and the spirit of the following disclosure and the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a table illustrating an example of contents of information stored as device management data in the storage device of FIG. 3;

FIG. 6 is a table illustrating an example of contents of user information stored in the storage device of FIG. 3;

FIGS. 9A and 9B are flowcharts illustrating an operation of providing client device management data, performed by the network apparatus of FIG. 3, according to an exemplary embodiment;

DETAILED DESCRIPTION OF PREFERRED EMBODIMENTS

Figure 1:
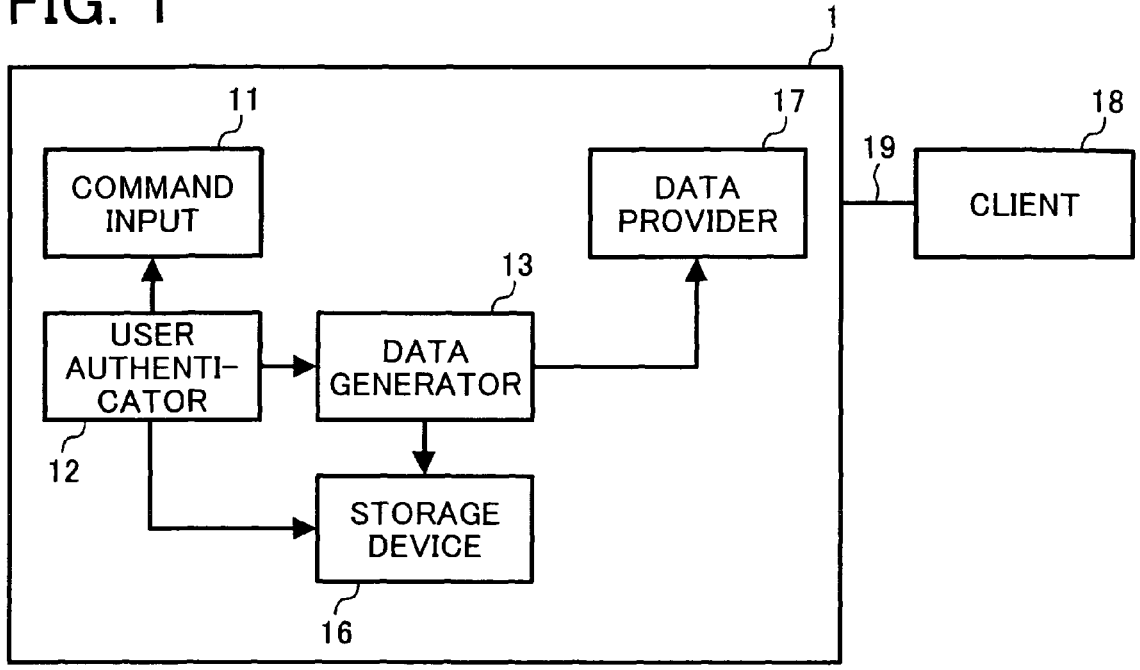
FIG. 1 is a block diagram illustrating a functional structure of a network apparatus, according to an exemplary embodiment of the present application.

In describing preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates a network apparatus 1 according to an exemplary embodiment of the present application.

As shown in FIG. 1, the network apparatus 1 includes a command input 11, a user authenticator 12, a data generator 13, a storage device 16, and a data provider 17. The network apparatus 1 may perform one or more functions according to an instruction received from a client 18 via a network 19.

The storage device 16 stores user information, which includes any kind of information regarding registered users of the network apparatus 1. The user information includes, for example, user authentication data, authorized function data, and authorized data type data, which are stored in a corresponding manner for each of the registered users. The user authentication data includes any kind of information that can be used to authenticate a user who currently logs on the client 18. For simplicity, the user and the client 18 may be used interchangeably in this exemplary embodiment. The authorized function data includes any kind of information indicating at least one of the functions of the network apparatus 1 that is authorized for operation by the client 18. The authorized data type data includes any kind of information indicating a type of device management data accessible to the client 18.

The command input 11 receives various instructions from the client 18, including an operation command for requesting the network apparatus 1 to perform one or more of the functions for the client 18, or a request command for requesting the network apparatus 1 to provide device management data corresponding to the client 18 ("client device management data"), for example.

The user authenticator 12 determines whether authentication of the client 18 is required by the network apparatus 1. If authentication is required, the user authenticator 12 authenticates the client 18, using the user authentication data stored in the storage device 16.

The data generator 13 generates device management data in a predetermined XML-based format. The predetermined XML-based format may be previously determined depending on a specific use of the network apparatus 1. Preferably, the predetermined XML-based format may be selected from XML family of technologies, including various XML applications such as RDF (resource description framework). For example, if the device management data is to be updated periodically, RSS (RDF site summary) may be preferably used as the predetermined XML-based format.

The data provider 17 provides various kinds of data, such as the device management data, to the client 18 via the network 19.

In one exemplary operation, the client 18 sends an operation command for requesting the network apparatus 1 to perform a desired function. Once the operation command is received via the command input 11, the user authenticator 12 determines whether authentication of the client 18 is required by the network apparatus 1. For example, the user authenticator 12 may refer to an authentication indicator stored in the storage device 16, which indicates whether authentication is required by the network apparatus 1.

If authentication is required, the user authenticator 12 extracts user authentication data from the operation command. Alternatively, the user authenticator 12 may request the client 18 for user authentication data, if the user authentication data is not provided with the operation command. The user authenticator 12 determines whether the client 18 is an authorized user, i.e., one of the registered users, by comparing the received user authentication data with the user authentication data stored in the storage device 16. If the received authentication data does not correspond to the stored authentication data, the user authenticator 12 sends an error message to the client 18.

If the received authentication data corresponds to the stored authentication data, the user authenticator 12 determines whether the client 18 is authorized to perform the desired function, by referring to the authorized function data stored in the storage device 16. If the desired function is not authorized for operation by the client 18, the user authenticator 12 sends an error message to the client 18.

If the desired function is authorized for operation by the client 18, the user authenticator 12 causes the network apparatus 1 to perform the desired function. At the same time, the data generator 13 generates device management data, in a predetermined XML-based format, including information regarding the desired function performed by the network apparatus 1. The device management data is stored in the storage device 16, preferably, in a corresponding manner with the user authentication data.

In another exemplary operation, the client 18 sends a request command for requesting the network apparatus 1 to provide client device management data. Once the request command is received via the command input 11, the user authenticator 12 determines whether authentication of the client 18 is required by the network apparatus 1. If authentication is required, the user authenticator 12 extracts user authentication data from the request command. Alternatively, the user authenticator 12 may request the client 18 for user authentication data, if the user authentication data is not provided with the request command.

The user authenticator 12 determines whether the client 18 is an authorized user by comparing the received user authentication data with user authentication data stored in the storage device 16. If the received authentication data does not correspond to the stored authentication data, the user authenticator 12 sends an error message to the client 18.

If the received authentication data corresponds to the stored authentication data, the data generator 13 generates client device management data, in a predetermined XML-based format, by referring to the authorized data type data stored in the storage device 18.

The data provider 17 provides the client device management data to the client 18 via the network 19.

In this exemplary embodiment, the data generator 13 generates client device management data, by referring to the authorized data type data. However, the data generator 13 may generate client device management data, by referring to the authorized function data.

Further, in this exemplary embodiment, a part of or the entire storage device 16 may be provided outside of the network apparatus 1, as long as the network apparatus 1 can obtain necessary information, such as the user authentication data and the authorized data type data, for example.

Figure 2:
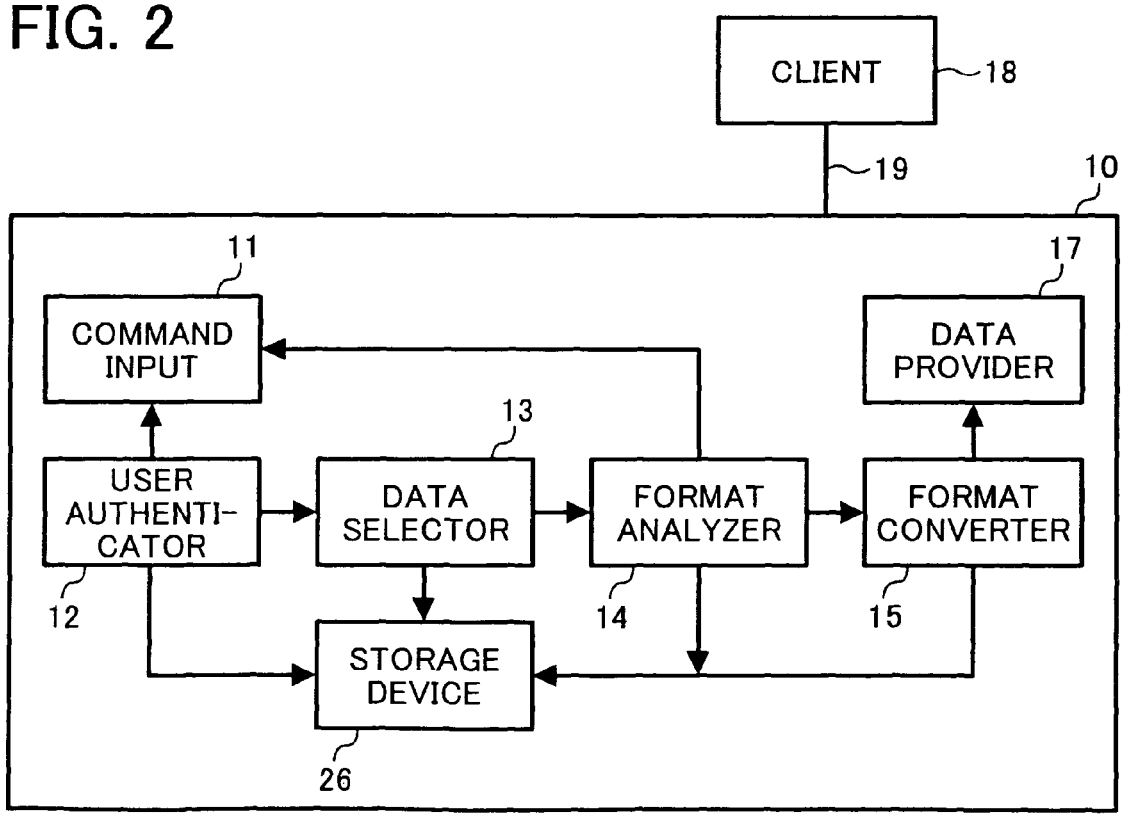
FIG. 2 is a block diagram illustrating a functional structure of a network apparatus, according to another exemplary embodiment.

Referring to FIG. 2, a network apparatus 10 is now explained according to an exemplary embodiment of the present application. The network apparatus 10 includes the command input 11, the user authenticator 12, the data generator 13, a storage device 26, a format analyzer 14, a format converter 15, and the data provider 17. The network apparatus 10 may perform one or more functions according to an instruction received from the client 18 via the network 19.

The storage device 26 stores user information for each registered user of the network apparatus 1, and format conversion data.

The format analyzer 14 analyzes a client format specified by the client 18.

The format converter 15 converts device management data from the predetermined XML-based format to the client format, using the format conversion data stored in the storage device 26.

In one exemplary operation, the client 18 sends a request command for requesting the network apparatus 10 to provide client device management data. Once the request command is received via the command input 11, the user authenticator 12 determines whether authentication of the client 18 is required by the network apparatus 10. If authentication is required, the user authenticator 12 extracts user authentication data from the request command. Alternatively, the user authenticator 12 may request the client 18 for user authentication data, if the user authentication data is not provided with the request command.

The user authenticator 12 determines whether the client 18 is an authorized user by comparing the received user authentication data with user authentication data stored in the storage device 16. If the received authentication data does not correspond to the stored authentication data, the user authenticator 12 sends an error message to the client 18.

If the received authentication data corresponds to the stored authentication data, the data generator 13 generates client device management data, in a predetermined XML-based format, by referring to the authorized data type data stored in the storage device 18.

The format analyzer 14 specifies a client format of the client 18. In one example, the format analyzer 14 may extract information regarding the client format from the request command received from the client 18. Alternatively, the format analyzer 14 may request the client 18 for the client format information, if the client format information is not provided with the request command.

Once the client format is specified, the format analyzer 14 determines whether the client format matches the predetermined XML-based format. If they match, the format analyzer 14 sends the client device management data to the data provider 17. If they do not match, the format analyzer 14 further determines whether the client format is supported by the network apparatus 10.

To determine whether the client format is supported, the format analyzer 14 may refer to the format conversion data stored in the storage device 26. If the specified client format is supported, the format analyzer 14 instructs the format converter 15 to convert the client device management data from the predetermined XML-based format to the client format. If the specified client format is not supported, the format analyzer 14 may send an error message to the client 18.

Alternatively, the format analyzer 14 may instruct the format converter 15 to convert the predetermined XML-based format to the client format, without making such determination.

The format converter 15 converts the client device management data from the predetermined XML-based format to the client format, using the format conversion data stored in the storage device 26. The format converter 15 then sends the converted client device management data to the data provider 17.

The data provider 17 provides the client device management data to the client 18 via the network 19.

In this exemplary embodiment, the data generator 13 generates client device management data, by referring to the authorized data type data. However, the data generator 13 may generate client device management data, by referring to the authorized function data.

Further, in this exemplary embodiment, a part of or the entire storage device 26 may be provided outside of the network apparatus 10, as long as the network apparatus 10 can obtain necessary information, such as the user authentication data, the authorized data type data, and the format conversion data, for example.

Any one of the network apparatuses of the present application, including the network apparatus 1 or 10, may be implemented in various ways or systems, for example, as office equipment, communication devices, image processing devices, home appliances, etc. Referring now to FIGS. 3 to 10, a network apparatus 100 having a copier function, a printer function, a fax function, and a web server function, is explained as one exemplary implementation of the network apparatus of the present application.

Figure 3:
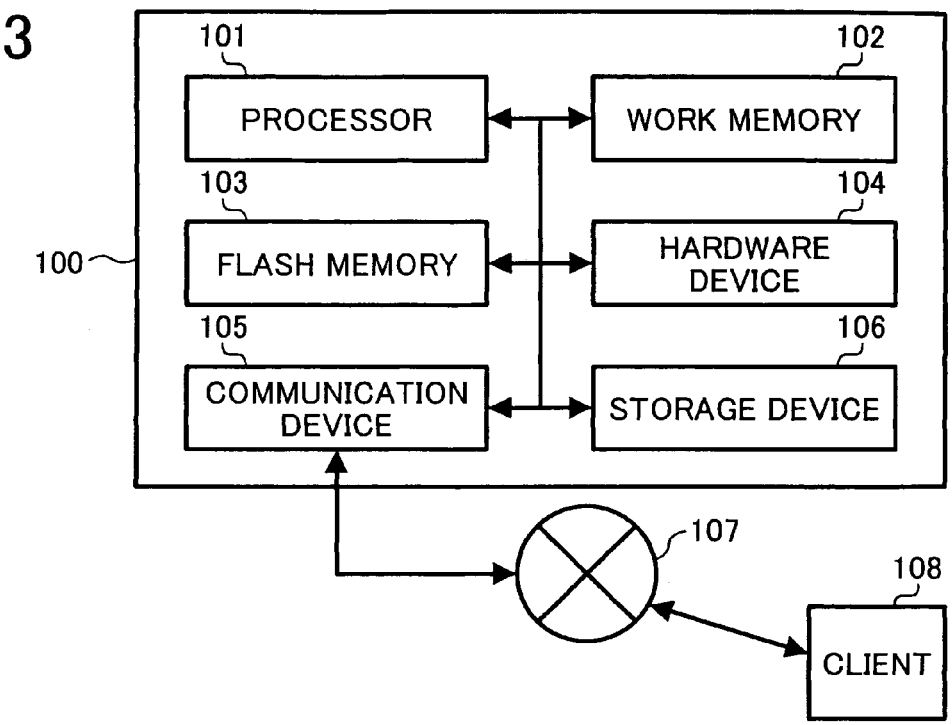
FIG. 3 is a block diagram illustrating a hardware structure of a network apparatus, according to an exemplary embodiment.

As shown in FIG. 3, the network apparatus 100 includes a processor 101, a work memory 102, a flash memory 103, a hardware device 104, a communication device 105, and a storage device 106. The network apparatus 100 is connected to a client 108 through a network 107.

The processor 101 includes any kind of processor, capable of controlling the operation of the network apparatus 100. The processor 101 performs at least one of the copier function, the printer function, the fax function, and the web function, in cooperation with the hardware device 104.

The work memory 102 includes any kind of volatile memory, such as a RAM (random access memory), for example. The flash memory 103 includes any kind of nonvolatile memory, such as a ROM (read only memory), for example.

The hardware device 104 includes a set of specific hardware components related to the copier function, the printer function, and the fax function, respectively.

The communication device 105 includes any kind of communication device, communication circuit, or input/output interface, which allows the network apparatus 100 to communicate with other devices on the network 107, such as the client 108. Preferably, the communication device 105 includes a set of hardware components related to the web function. The network 107 includes any kind of network, such as a LAN (local area network) or the Internet, for example.

The client 108 includes one or more general-purpose computers. Alternatively, or additionally, the client 108 may include one or more devices each capable of sending an instruction to the network apparatus 100, such as a PDA (personal digital assistance) device, notebook computer, mobile phone, for example. Further, the client 108 may include or may be connected to one or more peripheral devices, such as an input device or a display device, for example.

In this exemplary embodiment, the client 108 preferably includes a computer-readable program, which allows the client 108 to read device management data obtained from the network apparatus 100. For example, a web browser capable of reading a HTML document or an RSS reader capable of reading an RSS document may be incorporated in the client 108 as a client software.

Figure 4:
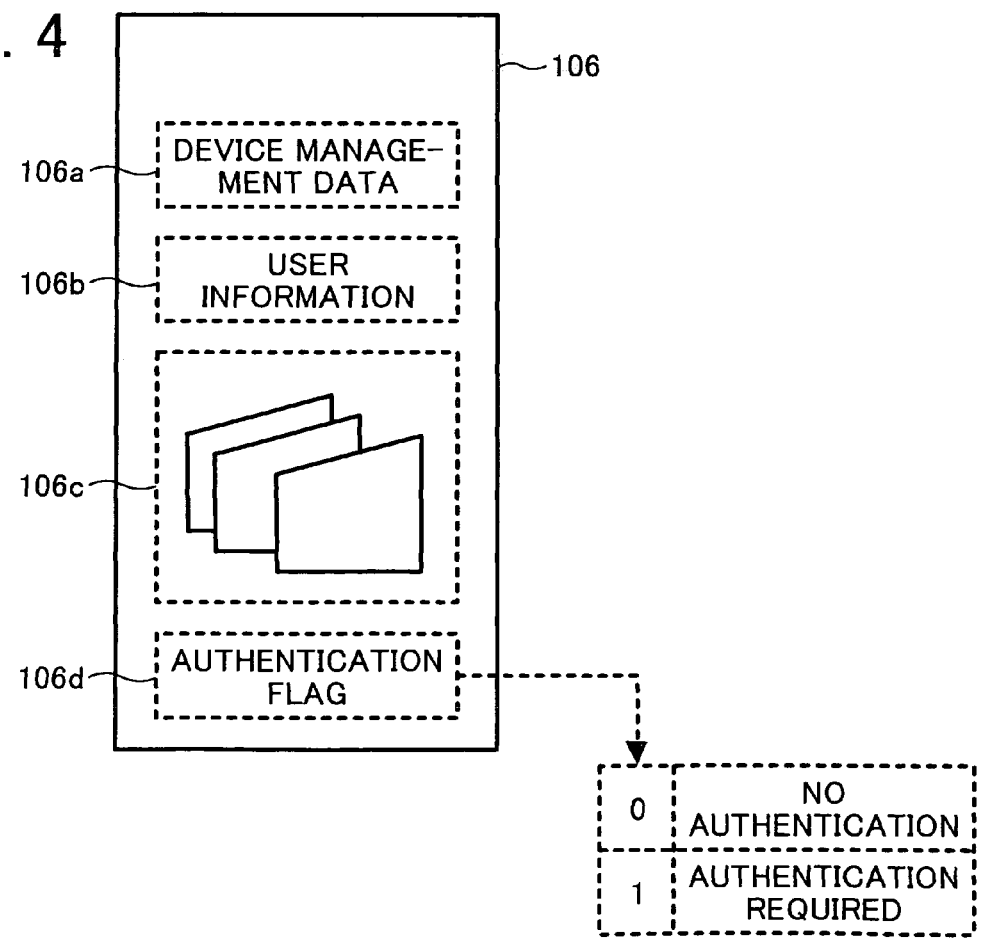
FIG. 4 is a block diagram illustrating a storage device of FIG. 3, according to an exemplary embodiment.

The storage device 106 includes any kind of storage device, such as a hard disk drive, capable of storing a large amount of data. As illustrated in FIG. 4, the storage device 106 may store device management data in a first data section 106a, user information in a second data section 106b, a plurality of format conversion files in a third data section 106c, and an authentication flag in a fourth data section 106d. Further, a format list may be stored in the third data section 106c.

As shown in FIG. 5, the device management data mainly includes device setting data, device status data, and device log data.

The device setting data describes initial setting of the network apparatus 100. For example, the device setting data may include identification data such as a fax number, a network IP address, or a DNS server assigned to the network apparatus 100, header data to be added to data being sent, read setting data indicating reading conditions such as a reading resolution, print setting data indicating printing conditions such as a printing resolution, authentication type data indicating one or more authentication type allowed, or recommended, by the network apparatus 100, etc.

The device status data describes current status of the network apparatus 100. For example, the device status data may include toner data indicating toner supply, memory data indicating an available memory size, sheet data indicating paper supply, printed page data indicating an amount of printed pages, etc.

The device log data describes activities or jobs performed by the network apparatus 100. For example, the device log data may include job number data indicating an identification number assigned to each job being performed, job type data indicating a type of the job, i.e., one of the functions of the network apparatus 100 performing the job, user ID data indicating a user who has requested to perform the job, log file number data indicating an identification number assigned to a log file describing the job, etc.

For example, as illustrated in FIG. 5, if a user having the user ID "0001" requests the network apparatus 100 to perform a job of printing one sheet of paper, this job may be assigned with a job number "0000", and the job type "PRINTER" may be selected. Further, a log file having a log file number "0" may be created, indicating a number of sheets being printed, a type or size of the sheet being used, etc.

In another example, if a user having the user ID "0004" requests the network apparatus 100 to perform a job of faxing two sheets of paper, this job may be assigned with a job number "0001", and the job type "FAX" may be selected. Further, a log file having a log file number "1" may be created, indicating a number of sheets being faxed, a transmission time, a transmission result, a destination fax number, etc.

In another example, if the network apparatus 100 receives a fax addressed to a user, this job may be assigned with a job number "0002", and the job type "FAX" may be selected. Further, a log file having a log file number "2" may be created, indicating a number of fax sheets being received, a transmission time, a transmission result, a sender fax number, etc.

In another example, if a user having the user ID "−1" requests the network apparatus 100 to perform a job of copying ten sheets of paper, this job may be assigned with a job number "0005", and the job type "COPIER" may be selected. Further, a log file having a log file number "4" may be created, indicating a number of sheets being copied, a type or size of the sheet being used, etc. In this exemplary embodiment, the identification number "−1" is assigned to a guest user, who is allowed to log into the network apparatus 100 without authentication.

To allow the guest user to log in, the network apparatus 100 sets the authentication flag to "0", which indicates "no authentication", as illustrated in FIG. 4. Since authentication is not required when the authentication flag is set to "0", any user can have access to any of the functions of the network apparatus 100.

If the authentication flag is set to "1", which indicates "authentication required", the network apparatus 100 requires all users to log in with the user authentication data. Since authentication is required when the authentication flag is set to "1", a guest user is prohibited to have access to any of the functions of the network apparatus 100 unless the user is authenticated. Further, for improved security, the device setting data of FIG. 5 may be accessed only by the administrator of the network apparatus 100. Further, the device status data may be accessed by a general user, only if the device status data is related to the function that can be operated by the general user. Furthermore, the device log data may be accessed by a general user, only if the device log data is related to the job performed by the general user.

FIG. 6 illustrates exemplary user information stored in the second data section 106b of the storage device 106. Referring to FIG. 6, the user information includes the user ID data, user authentication data, authorized function data, and authorized data type data, in a corresponding manner, for each registered user of the network apparatus 100.

The user ID data is preferably the same as the user ID data of FIG. 5. In this exemplary embodiment, the user ID number "0000" is assigned, as the user ID data, to the administrator of the network apparatus 100. The user ID numbers "0001" to "9999" are assigned, as the user ID data, to general users having access to the network apparatus 100.

The user authentication data is used to authenticate a user at the time of logging in, and includes a set of user name data and password data, as illustrated in FIG. 6. The user name data indicates a user name determined by a user, such as the last name of the user, for example. The password data indicates a password determined by the user. For example, when the administrator logs in the network apparatus 100, the administrator inputs the user name "admin" and the password "7584". The network apparatus 100 compares the input user name and password, with the user name and password stored in the storage device 106.

The authorized function data indicates which of the functions of the network apparatus 100 is allowed for operation by a specific user. In this exemplary embodiment, the administer is not allowed to perform any of the functions, while any one of the general users is allowed to perform at least one of the functions.

The authorized data type data indicates which of the device management data stored in the network apparatus 100 can be accessed by a specific user. In this exemplary embodiment, the administrator is allowed to access all kinds of device management data stored in the storage device 106, including the device setting data, the device status data, and the device log data. The general user is allowed to access at least the device log data for the self-performed job, and the device status data for the authorized function. For example, the general user having the user name "tanaka" is allowed to obtain the device log data corresponding to the user ID "0002" and the device status data related to the copier function, as shown in FIG. 6. Assuming that the storage device 106 stores the device management data of FIG. 5, the log file number "3" and the device status data related to the copier function can be accessed by the user "tanaka".

The format conversion file stored in the third section 106c is used for converting the device management data from the predetermined XML-based format to any other format, such as the client format specified by the client 108. In this exemplary embodiment, a plurality of XSLT (extensible stylesheet language transformations) files are stored.

The format list, which may be stored in the third section 106c, lists a plurality of formats supported by the network apparatus 100. For example, the format list may include names or versions of the supported formats. The listed formats should correspond to the XSLT files stored in the storage device 106.

In addition to the above-descried data shown in FIG. 4, the storage device 106 may include a plurality of computer-readable programs, including various application programs. When the network apparatus 100 is activated, the network apparatus 100 loads at least one of the application programs onto the flash memory 103, and causes the processor 101 and the hardware device 104 to operate in a substantially similar manner as described referring to FIG. 1 or 2, for example.

Figure 7:
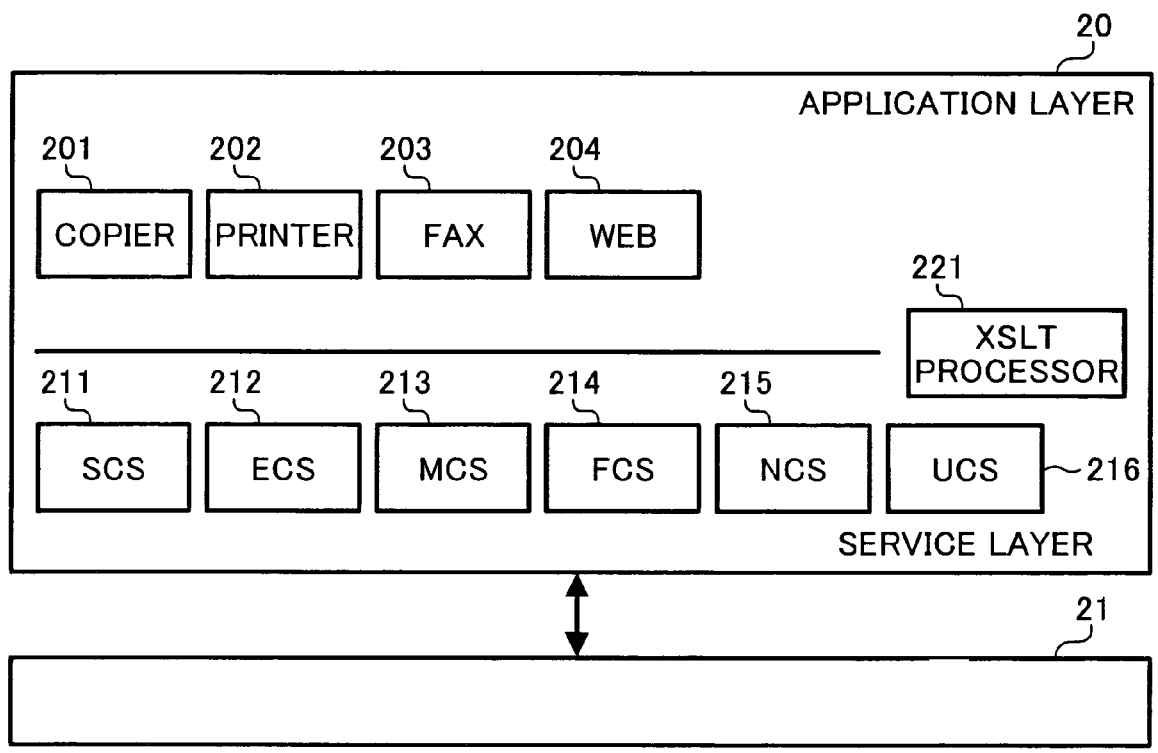
FIG. 7 is a block diagram illustrating a software architecture of the network apparatus shown in FIG. 3, according to an exemplary embodiment.

FIG. 7 illustrates an exemplary software architecture 20 of the network apparatus 100. The software architecture 20 mainly includes an application layer, a service layer, and an XSLT processor 221, each of which operates in cooperation with a hardware architecture 21.

The application layer of the software architecture 20 includes various application programs each corresponding to one of the functions provided by the network apparatus 100. In this exemplary embodiment, the application layer includes a copier application 201 providing the copier function, a printer application 202 providing the printer function, a fax application 203 providing the fax function, and a web application 204 providing the web function. The web function includes a function of communicating with other devices on the network 107, using the web technology or the web services technology.

The service layer of the software architecture 20 includes various services, which may be commonly used by the application programs. In this exemplary embodiment, the service layer includes a system control service (SCS) 211, an engine control service (ECS) 212, a memory control service (MCS) 213, a fax control service (FCS) 214, a network control service (NCS) 215, and a user information control service (UCS) 216. The SCS 211 controls the operation of the network apparatus 100, for example, according to an instruction received from the client 108. The ECS 212 controls various kinds of engine, including an input engine such as a scanner engine, or an output engine such as a plotter engine, for example. The MCS 213 controls the operation related to the storage device 106. The FCS 214 controls the operation related to the fax function. The NCS 215 controls input or output of data to or from the network apparatus 100. The UCS 216 manages or uses the user information stored in the storage device 106.

The service layer may further include a delivery control service (DCS) or a certificate control service (CCS), for example, depending on a specific operation provided by the network apparatus 100.

The hardware architecture 21 includes any kind of hardware component of the hardware device 104 of FIG. 3. For example, the hardware architecture 21 may include an input engine such as the scanner engine, an output engine such as the plotter engine, or a user interface such as an operational panel, for example.

The XSLT processor 221 is capable of converting device management data from a predetermined XML-based format to a client format. The XSLT processor 221 may include any kind of XSLT processors known in the art.

In one exemplary operation, an operation command for requesting the copier application 201 to perform the copy function may be input by the client 108.

Once the operation command is received via the NCS 215, the copier application 201 determines whether authentication is required. If authentication is required, the copier application 201 displays a login screen to the client 108. The copier application 201 authenticates the client 108 based on authentication data input by the client 108, using the UCS 216.

Once the client 108 is authenticated, the copier application 201 performs the copy function according to an instruction received from the client 108. At the same time, the copier application 201 generates device log data for the function being performed, in a predetermined XML-based format, using the services other than the NCS 215 of the service layer. For example, the copier application 201 may generate job number data, job type data, user ID data, and log file number data, in a corresponding manner, as illustrated in FIG. 5. The device management data may be stored in the storage device 106.

Figure 8:
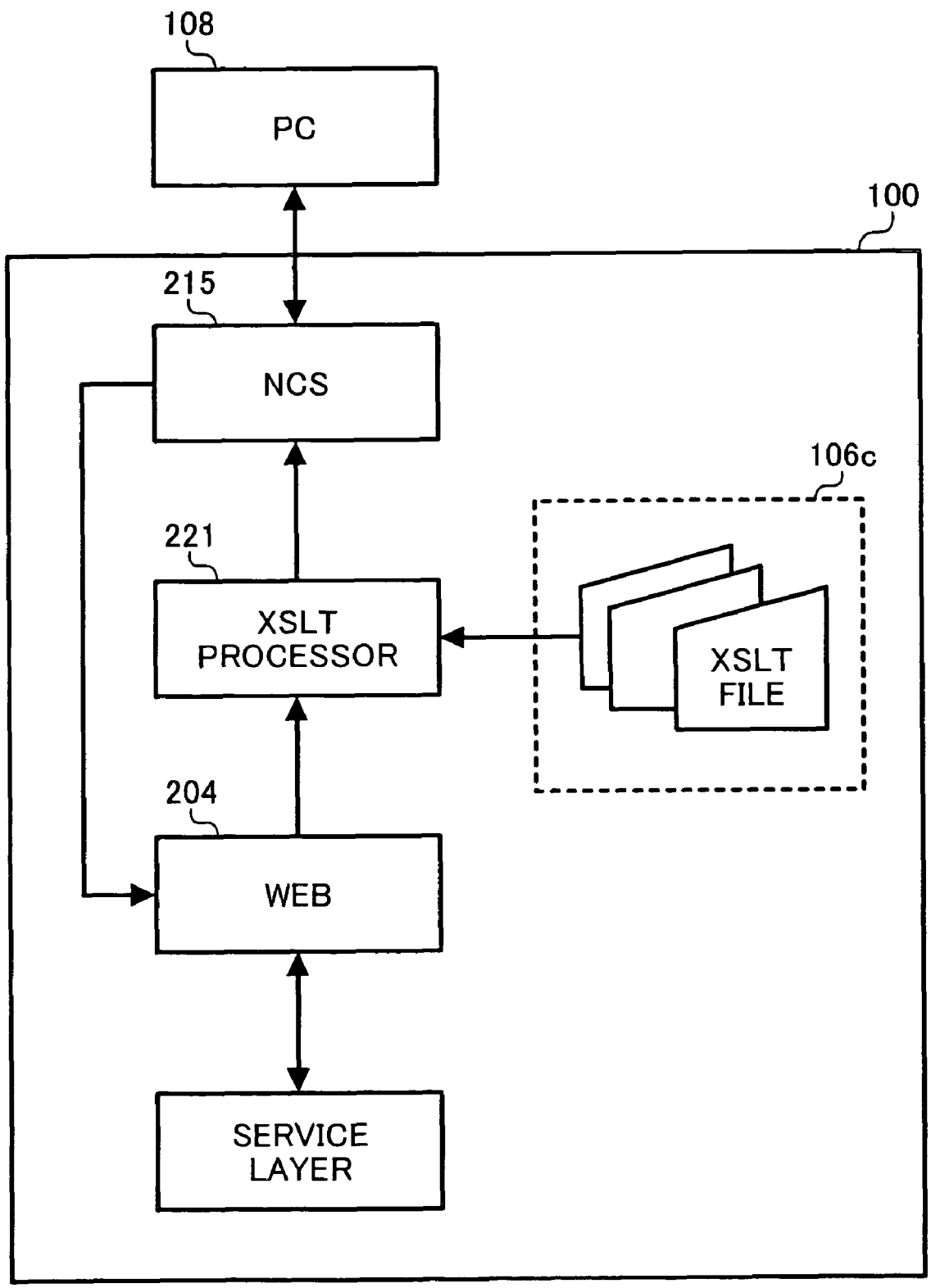
FIG. 8 is a portion of the software architecture shown in FIG. 7.

In another exemplary operation, a request command for requesting the web application 204 to provide client device management data may be input by the client 108, as illustrated in FIG. 8.

Once the request command is received via the NCS 215, the web application 204 determines whether authentication is required. If authentication is required, the web application 204 authenticates the client 108 based on authentication data input by the client 108, using the UCS 216.

If the client 108 is authenticated, the web application 204 determines which of the device management data can be accessed by the client 108, using the UCS 216. Based on this determination result, the web application 204 generates client device management data, in a predetermined XML-based format, using the services other than the NCS 215 of the service layer. The web application 204 provides the client device management data to the client 108 via the NCS 215.

In this exemplary operation, the client device management data may be provided to the client 108 in a client format specified by the client 108. As illustrated in FIG. 8, the XSLT processor 221 selects one of the XSLT files stored in the storage device 106, which corresponds to the client format. Using the selected file, the XSLT processor 221 converts the client device management data from the predetermined XML-based format to the client format.

Figure 9B:
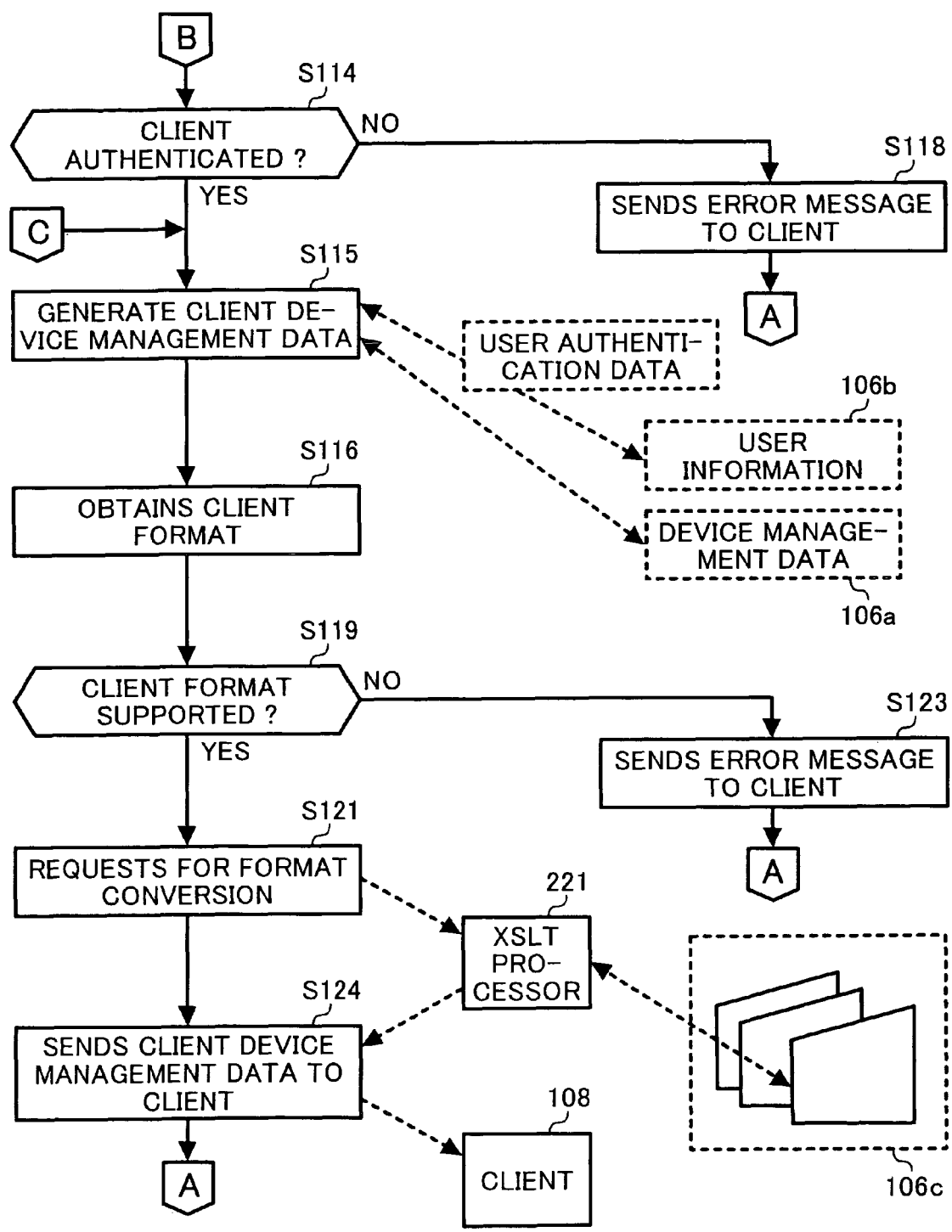

Referring now to FIGS. 9A and 9B, an exemplary operation of providing client device management data to the client 108, performed by the web application 204, is explained.

Referring to FIG. 9A, Step S101 monitors whether a request command is sent from the client 108 via the NCS 215. This step may be performed continuously or at a predetermined timing. The predetermining timing includes, for example, a timing defined by the network apparatus 100 or the client 108, a timing when the network apparatus 100 receives an instruction from the client 108, or a timing when device management data stored in the storage device 106 is updated.

In this exemplary embodiment, the network apparatus 1 receives the request command from the client 108 via the network 107. The request command is preferably provided with information regarding a client format, and user authentication data including user name data and password data. Further, the request command may be written based on a predetermined protocol. In this exemplary embodiment, the request command is written based on HTTP (Hypertext Transfer Protocol) or HTTPS (HTTP over secure socket layer).

Step S102 obtains the protocol of the request command.

Step 103 determines whether the obtained protocol is HTTP. If the obtained protocol is HTTP ("YES" in Step S103), the operation proceeds to Step S104. Otherwise ("NO" in Step S103), the operation proceeds to Step S107.

Step S104 obtains authentication type data stored in the storage device 106. As described above with reference to FIG. 4, the authentication type data indicates one or more authentication types allowed by the network apparatus 100. Examples of the authentication types include basic authentication, form-based authentication, client-certificate authentication such as HTTPS authentication, and digest authentication, for example.

Step S105 determines whether communication based on HTTP is allowed by referring to the authentication type data. If HTTP is allowed ("YES" in Step S105), the operation proceeds to Step S110. If HTTP is not allowed ("NO" in Step S105), the operation proceeds to Step S106 to send an error message to the client 108, and the operation further returns to Step S101. For example, the response status code 302 "Moved Temporarily" may be sent to the client 108.

Step S107 obtains authentication type data stored in the storage device 106.

Step S108 determines whether communication based on HTTPS is allowed by referring to the authentication type data. If HTTPS is allowed ("YES" in Step S108), the operation proceeds to Step S110. If HTTPS is not allowed ("NO" in Step S108), the operation proceeds to Step S109 to send an error message to the client 108, and the operation further returns to Step S101. For example, the response status code 404 "Not Found" may be sent to the client 108.

Step S110 sets the obtained protocol to be used for communication with the client 108.

Step S111 determines whether the authentication flag of the storage device 106 indicates "1", that is, "authentication required". If it is determined that authentication is required ("YES" in Step S111), the operation proceeds to Step S112. Otherwise ("NO" in Step S111), the operation proceeds to Step S115 of FIG. 9B.

Step S112 requests for authentication of the client 108. In this exemplary embodiment, the web application 204 sends the user authentication data, obtained in Step S101, to the UCS 216. The UCS 216 compares the received user authentication data with user authentication data stored in the storage device 106, and sends the authentication result to the web application 204.

Step S113 receives the authentication result from the UCS 216.

Referring to FIG. 9B, Step S114 determines whether the client 108 is authenticated. If the client 108 is authenticated ("YES" in Step S114), the operation proceeds to Step S115. If the client 108 is not authenticated ("NO" in Step S114), the operation proceeds to Step S118.

Step S118 sends an error message to the client 108, and the operation returns to Step S101. In this exemplary embodiment, the web application 204 may send the response status code 401 "Unauthorized" or the response status code 403 "Forbidden". Alternatively, the web application 204 may send a HTML document indicating that the client 108 is not authenticated.

Step S115 generates client device management data, in a predetermined XML-based format, corresponding to the client 108.

In one exemplary embodiment, if authentication is required in Step S111, the web application 204 extracts the authorized data type data corresponding to the obtained user authentication data from the storage device 106, and determines which of the device management data can be accessed by the client 108.

Based on the extracted authenticated data type data, the web application 204 extracts information that can be accessed by the client 108 from device management data stored in the storage device 106. For example, referring back to FIG. 6, if the user having the user ID "0001" with the user name "kimura" is logged onto the client 108, the web application 204 obtains the authorized data type data corresponding to the user ID "0001". According to the authorized data type data, the device log data of the user, and the device status data related to the copier or printer function can be accessed. Referring back to FIG. 5, the web application 204 extracts the log file having the log file number "0", which corresponds to the user ID "0001". In addition, the web application 204 extracts the toner data, the memory data, the sheet data, or the printed page data, for the printer or copier function.

The web application 204 generates client device management data based on the extracted information. For the above-described case of the user "0001", the client device management data is generated based on the log file "0", or the device status data for the copier or printer function.

In another exemplary operation, if authentication is required in Step S111, the web application 204 extracts the authorized function data corresponding to the user authentication data from the storage device 106, and determines which of the functions is allowed for operation by the client 108.

Based on the extracted authorized function data and the user authentication data, the web application 204 extracts information that can be accessed by the client 108 from the device management data stored in the storage device 106. For example, referring back to FIG. 6, if the user having the user ID "0002" with the user name "tanaka" is logged onto the client 108, the web application 204 obtains the authorized function data corresponding to the user ID "0002". According to the authorized function data, only the copier function is allowed for operation by the user "0002". Referring back to FIG. 5, the web application 204 extracts the log file having the log file number "3", which corresponds to the user ID "0002". In addition, the web application 204 extracts the toner data, the memory data, the sheet data, or the printed page data, for the copier function.

The web application 204 generates client device management data based on the extracted information. For the above-described case of the user "0002", the client device management data is generated based on the log file "3", or the device status data for the copier function.

In another exemplary operation, if authentication is not required in Step S111, the client 108 is treated as a guest user. The guest user can perform any of the functions provided by the network apparatus 100. Further, the guest user can have access to any of the device management data stored in the storage device 106, except for the device setting data. Accordingly, the web application 204 generates client device management data, based on the device status data and the device log data.

Step S116 obtains the information regarding the client format of the client 108, which has been received in Step S101.

Step S119 determines whether the client format matches any of the formats supported by the network apparatus 100. The web application 204 may refer to the format list stored in the storage device 106, or it may search through the format conversion files stored in the storage device 106. If the client format is supported ("YES" in Step S119), the operation proceeds to Step S121. Otherwise ("NO" in Step S119), the operation proceeds to Step S123.

Step S123 sends an error message to the client 108. In this exemplary embodiment, the web application 204 may send the response status code 400 "Bad Request" or the response status code 404 "Not Found".

Step S121 requests the XSLT processor 221 to convert the client device management data from the predetermined XML-based format to the client format. In this exemplary embodiment, the XSLT processor 221 obtains an XSLT file corresponding to the client format from the storage device 106. For example, if the predetermined XML-based format is based on RSS2.0 and HTML is requested as the client format, the XSLT processor 221 obtains an XSLT file corresponding to the HTML, and converts the RSS2.0 to HTML using the obtained XSLT file. In another example, if the predetermined XML-based format is based on RSS1.0 and RSS2.0 is requested as the client format, the XSLT processor 221 obtains an XSLT file corresponding to the RSS2.0, and converts the RSS1.0 to RSS2.0 using the obtained XSLT file. In addition to HTML and RSS, any kind of XML-based format, such as RDF or Atom, may be used as the client format.

Step S124 receives the converted client device management data from the XSLT processor 221, and sends it to the client 108 via the NCS 215.

Upon receiving the client device management data, the client 108 displays the client device management data, using the client software. For example, the client 108 uses a web browser to read the client device management data written in HTML. In another example, the client 108 uses an RSS reader to read the client device management data written in RSS.

The above-described steps shown in FIGS. 9A and 9B may be performed in different order, as apparent to those skilled in the art.

Further, the above-described operation assumes that the information regarding the client format is provided with the request command in Step S101. However, the information regarding the client format may be provided in any other timing before performing Step S121 of converting. For example, the information regarding the client format may be provided in Step S116.

Furthermore, the above-described operation assumes that the user authentication data is provided with the request command in Step S101. However, the user authentication data may be provided at any other timing before Step S112 of requesting, for example.

Figure 10A:
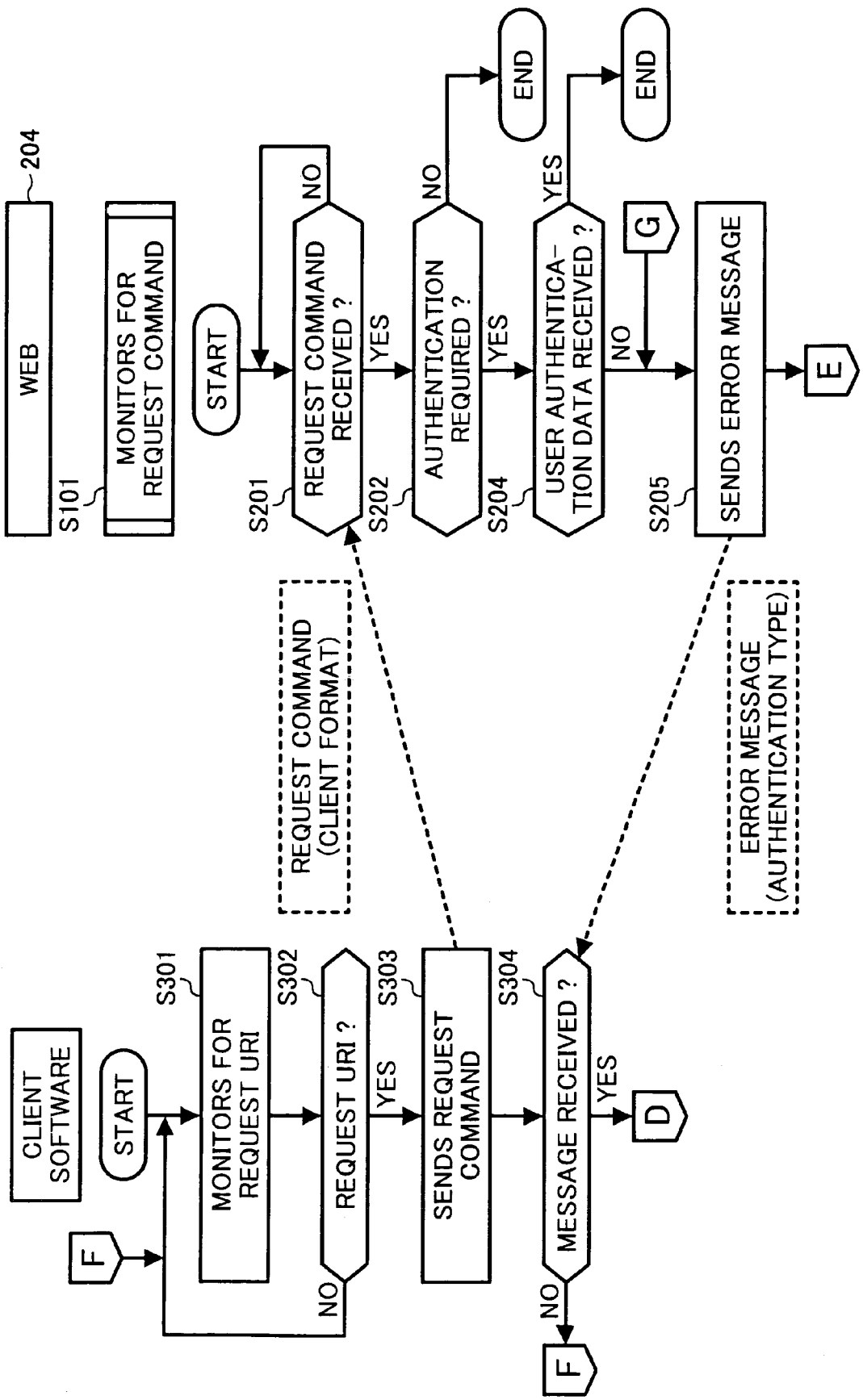
FIGS. 10A and 10B are flowcharts illustrating an operation of sending a request command to the network apparatus of FIG. 3, performed by the client of FIG. 3, according to an exemplary embodiment.
Figure 10B:
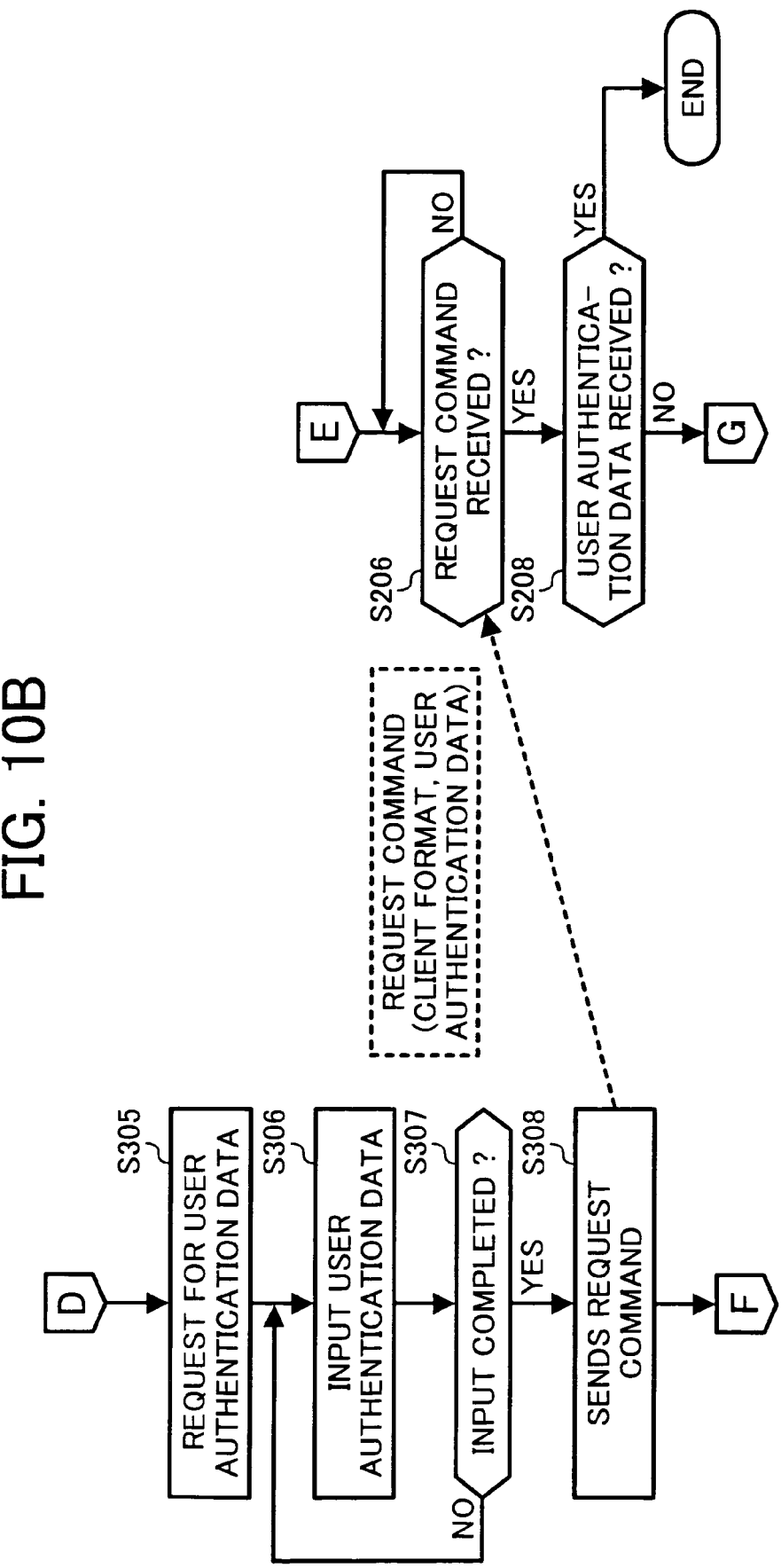

Referring now to FIGS. 10A and 10B, an exemplary operation of sending a request command, performed by the client software of the client 108, is explained. This operation may be performed while the web application 204 monitors for a request command in Step S101 of FIG. 9A, for example. The exemplary steps, which may be performed by the web application 204 in Step S101, are also shown in FIGS. 10A and 10B.

In Step S301 of FIG. 10A, the client software monitors whether a request URI is specified or added by a user. For example, if the web browser is used as the client software, the client software monitors whether a request URI is specified. In another example, if the RSS reader or the Atom client is used as the client software, the client software monitors whether a request URI is added.

In Step S302, the client software determines whether the request URI is specified or added. If the request URI is specified or added ("YES" in Step S302), the operation proceeds to Step S303. If the request URI is not specified or added ("NO" in Step S302), the operation returns to Step S301.

In Step S303, the client software generates a request command using the request URI obtained in Step S302, and sends the request command to the web application 204. At this time, the client software may add information regarding the client format to the request command.

As a result, the request command, including information regarding the request URI and the client format, is sent to the web application 204 via the network 107.

In one example, the client format may be written as a path of the request URI, such as:

"http://xxx.yyy.zzz.www/html/machineState.cgi" based on the HTTP protocol or "https://xxx.yyy.zzz.www/html/machineState.cgi" based on the HTTPS protocol, if the HTML is used as the client format; or "http://xxx.yyy.zzz.www/rss1.0/machineState.cgi" based on the HTTP protocol or "https://xxx.yyy.zzz.www/rss1.0/machineState.cgi" based on the HTTPS protocol, if the RSS 1.0 is used as the client format.

In another example, the client format may be written as an argument of the GET method, such as:

"http://xxx.yyy.zzz.www/machineState.cgi" based on the HTTP protocol or "https://xxx.yyy.zzz.www/machineState.cgi" based on the HTTPS protocol, if the HTML is used as the client format; or "http://xxx.yyy.zzz.www/machineState.cgi?xml=rss1.0" based on the HTTP protocol or "https://xxx.yyy.zzz.www/machineState.cgi?xml=rss1.0" based on the HTTPS protocol, if the HTML is used as the client format.

In addition to the information regarding the client format, the request command may be provided with user authentication data.

In Step S201, the web application 204 determines whether the request command is received from the client software. If the request command is received ("YES" in Step S201), the operation proceeds to Step S202. Otherwise ("NO" in Step S201), the operation returns to Step S201.

In Step S202, the web application 204 determines whether authentication of the client 108 is required, by referring to the authentication flag in the storage device 106. If authentication is required ("YES" in Step S202), the operation proceeds to Step S204. Otherwise ("NO" in Step S202), the operation ends Step S101, and proceeds to Step S115 of FIG. 9B.

In Step S204, the web application determines whether user authentication data is received from the client software. If the user authentication is received ("YES" in Step S204), the operation ends Step S101, and proceeds to Step S112 of FIG. 9B. Otherwise ("NO" in Step S204), the operation proceeds to Step S205.

In Step S205, the web application 204 sends an error message indicating that user authentication data is required. At this time, the web application 204 may send information regarding the authentication type recommended by the network apparatus 100.

In Step S304, the client software determines whether a message is received from the web application 204. If no message has been received ("NO" in Step S304), the client software assumes that the request command has been accepted by the web application 204. Accordingly, the operation returns to Step S301. If the error message generated in Step S205 is received ("YES" in Step S304), the operation proceeds to Step S305 of FIG. 10B.

In Step S305, the client software requests the user to input the user authentication data. For example, the client software may display a log in screen.

In Step S306, the client software inputs the user authentication data.

In Step S307, the client software determines whether the user authentication data has been input. If the user authentication data is input ("YES" in Step S307), the operation proceeds to Step S308. Otherwise ("NO" in Step S308), the operation returns to Step S306.

In Step S308, the client software sends the request command with the information regarding the client format, to the web application 204 via the network. At this time, the user authentication data is also provided using the authentication type specified in the error message received in Step S304 of FIG. 10A. The operation then returns to Step S301.

In Step S206, the web application 204 determines whether any request command is received from the client software. If a request command is received ("YES" in Step S206), the operation proceeds to Step S208. Otherwise ("NO" in Step S206), the operation repeats Step S206.

In Step S208, the web application 204 determines whether the received request command includes the user authentication data. If the user authentication data is received ("YES" in Step S208), the operation ends Step S101 and proceeds to Step S112 of FIG. 9A. Otherwise ("NO" in Step S208), the operation returns to Step S205.

Numerous additional modifications and variations are possible in light of the above teachings. It is therefore to be understood that within the scope of the appended claims, the disclosure of this patent specification may be practiced otherwise than as specifically described herein.

Figure 11:
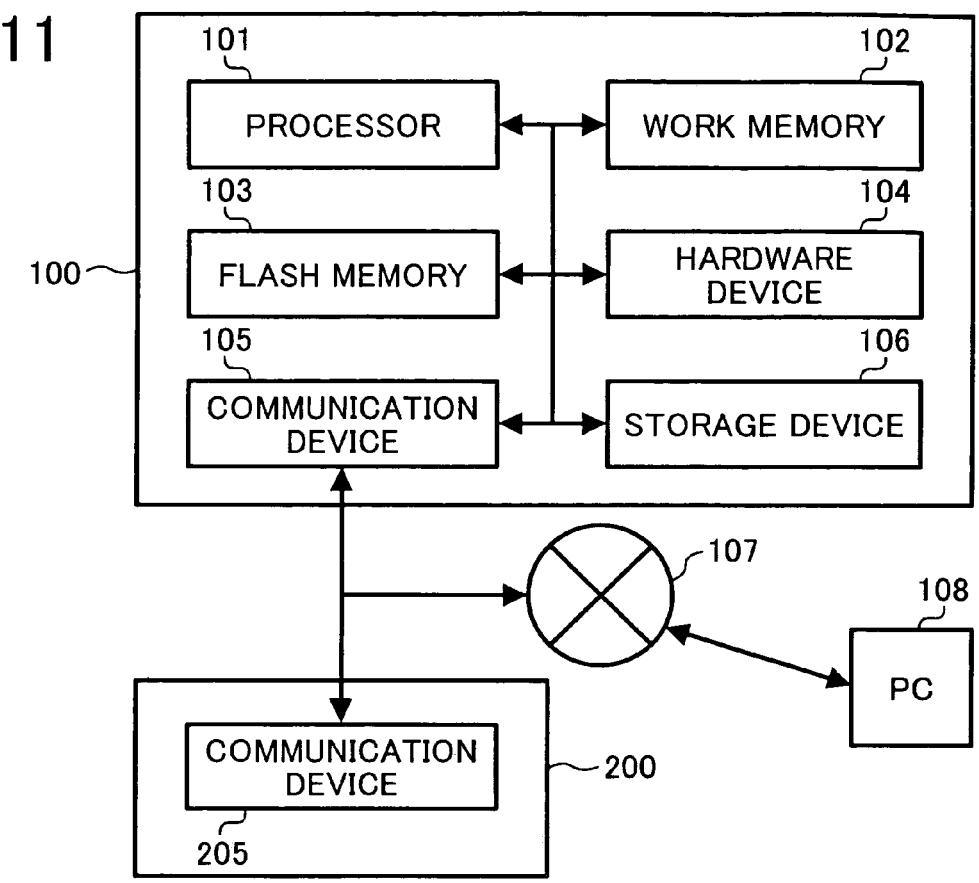
FIG. 11 is a block diagram illustrating a hardware structure of a network apparatus, according to another exemplary embodiment of the present application.

In one example, the network apparatus 100 may be connected to other devices or apparatuses via the network 107, as illustrated in FIG. 11. The system of FIG. 11 is substantially similar to the one shown in FIG. 3, except for the addition of a device 200.

The device 200 may include any kind of peripheral device connectable to the network 107 via a communication device 205, which is substantially similar to the communication device 105. In one example, the device 200 may be implemented as a document server, capable of storing document data handled by the client 108. In another example, the device 20 may be implemented as a mail server, capable of handling email data received or sent from the client 108.

Figure 12:
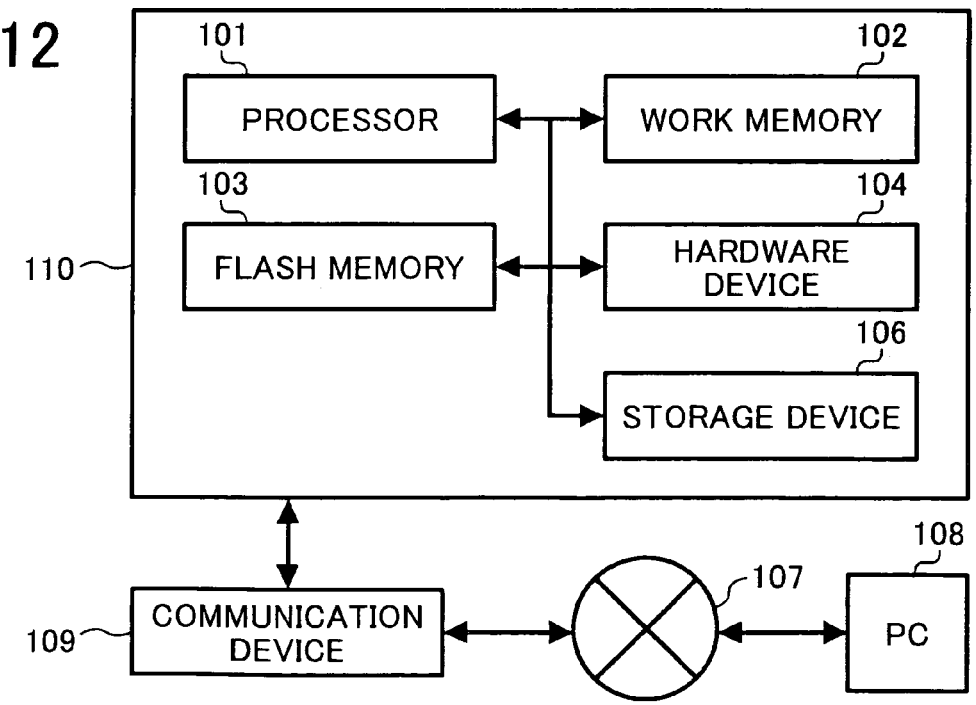
FIG. 12 is a block diagram illustrating a hardware structure of a network apparatus, according to another exemplary embodiment.

In another example, a portion of or the entire communication device 105 of the network apparatus 100 may be provided outside of the network apparatus 100, as illustrated in FIG. 12.

The network apparatus 110 of FIG. 12 is substantially similar to the network apparatus 100 of FIG. 3. The differences include the communication device 109, which is provided outside of the network apparatus 110.

Further, instead of sending an instruction, such as an operation command or a request command, using the client 108, a user may directly instruct the network apparatus 100, using an operational panel, which is a part of the hardware device 104. Similarly, instead of providing client device management data via the network 107, the network apparatus 100 may display client device management data on the operational panel.

Furthermore, any of the information stored in the storage device 106 may be stored in any storage device, other than the storage device 106, as long as it is downloadable by the network apparatus 100. Alternatively, any of the information stored in the storage device 106 may be stored in a storage medium, including floppy disks, optical discs, flash memory, magnetic or optical cards, etc.

Furthermore, the subject matter of the present application may be implemented using one or more microprocessors and/or signal processors programmed according to the teachings of the present disclosure, as mentioned above. Alternatively, the subject matter of the present application may be implemented by ASIC (Application Specific Integrated Circuit), prepared by an appropriate network of component circuits or by a combination thereof according to the present disclosure.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

This patent specification is based on and claims priority to Japanese patent application Nos. 2004-187794, filed on Jun. 25, 2004, and 2005-162295, filed on Jun. 2, 2005, in the Japanese Patent Office, the entire contents of which are hereby incorporated by reference.

What is claimed is:

1. A network apparatus connectable to a client through a network, comprising:
   a storage device configured to store device management data, an authentication indicator for indicating whether authentication is required by the network apparatus, and user information including user authentication data, authorized function data, and authorized data type data for each one of registered users of the network apparatus, the authorized function data indicating at least one of a plurality of functions of the network apparatus that is authorized for operation by the corresponding one of the registered users and the authorized data type data indicating a type of the device management data accessible by the corresponding one of the registered users;
   a command input configured to input a request command received from the client for requesting the network apparatus to provide client-specific device management data;
   a user authenticator configured to determine whether authentication is required based on the indication of the authentication indicator, and to authenticate the client using the user authentication data of the user information if the authentication indicator indicates authentication is required; and
   a data generator configured to generate client-specific device management data, in a predetermined format,
   wherein if the user authenticator determines that authentication is required and the client is authenticated, the data generator extracts client-related information related to a desired function performed by the client via the network apparatus from the device management data based on at least one of the authorized function data and the authorized data type data of the user information that corresponds to the user authentication data, and the data generator generates the client-specific device management data, in the predetermined format, based on the client-related information extracted from the device management data, and
   wherein if the user authenticator determines that authentication is not required, the data generator obtains the device management data from the storage device and generates the client-specific device management data, in the predetermined format, based on the device management data.

2. The network apparatus of claim 1, further comprising:
   a data provider configured to provide the client-specific device management data to the client.

3. The network apparatus of claim 1, further comprising:
   a format analyzer configured to specify a client format of the client, and to compare the client format with the predetermined XML-based format to generate a comparison result; and
   a format converter configured to convert the client-specific device management data from the predetermined XML-based format to the client format based on the comparison result.

4. The network apparatus of claim 3, wherein the storage device further comprises:
   format conversion data, wherein the format converter uses the format conversion data to convert the client-specific device management data.

5. The network apparatus of claim 3, further comprising:
   a data provider configured to provide the client-specific device management data converted by the format converter to the client.

6. The network apparatus of claim 1, wherein the user authenticator is configured to further obtain an authentication type from the request command, and to determine whether the network apparatus supports the authentication type obtained from the request command.

7. The network apparatus of claim 6, wherein the device management data includes authentication type data indicating an authentication type allowed by the network apparatus.

8. The network apparatus of claim 1, wherein the user authenticator is configured to further specify an authentication type before receiving the request command.

9. A network apparatus connectable to a client through a network, comprising:
   a data storage device configured to store device management data indicating a result of performing at least one of a plurality of functions of the network apparatus;
   a user information storage device configured to store user authentication data, and at least one of authorized function data and authorized data type data, in a corresponding manner, for each one of registered users of the network apparatus, the authorized function data indicating at least one of the plurality of functions of the network apparatus that is authorized for operation by the corresponding one of the registered users and the authorized data type data indicating a type of the device management data stored in the data storage device that is allowed for access by the corresponding one of the registered users;
   an authentication indicator storage device configured to store an authentication indicator which indicates whether authentication is required by the network apparatus for the client to perform at least one of the plurality of functions of the network apparatus;
   a data generator configured to generate client-specific device management data when a request command which requests the network apparatus to provide client-specific device management data is received from a specific user at the client; and a user authenticator configured to determine whether authentication is required by the network apparatus based on the authentication indicator stored in the authentication indicator storage device, wherein when the request command is received, the user authenticator determines whether authentication is required by the network apparatus, and if the user authenticator determines that authentication is not required, the data generator obtains the device management data of the network apparatus from the data storage device, and generates the client-specific device management data, in a predetermined format, based on the device management data of the network apparatus, and if the user authenticator determines that authentication is required, the data generator causes the user authenticator to perform authentication of the specific user at the client, and if the specific user is authenticated, the data generator extracts client-related information related to at least one of the plurality of functions of the network apparatus that is authorized for operation by the specific user at the client from the device management data stored in the data storage device using at least one of the authorized function data and the authorized data type data that corresponds to the specific user, and generates the client-specific device management data, in the predetermined format, based on the client-related information.

10. The apparatus of claim 9, wherein the device management data stored in the data storage device includes device status data describing the current status of the network apparatus, wherein if the user authenticator determines that authentication is not required, the data generator obtains the device status data of the network apparatus from the device management data stored in the data storage device, and generates the client-specific device management data based on the device status data of the network apparatus, and wherein if the user authenticator determines that authentication is required and the specific user at the client is authenticated, the data generator extracts client-specific device status data that is related to at least one of the plurality of functions of the network apparatus that is authorized for operation by the specific user at the client from the device status data of the network apparatus stored in the data storage device, and generates the client-specific device management data based on the client-specific device status data of the network apparatus.

11. The apparatus of claim 10, wherein the user authenticator is further configured to determine whether the user authentication data for the specific user is provided with the requested command, and request the client for the user authentication data if the user authentication data is not provided with the request command.

12. The apparatus of claim 11, wherein the plurality of functions of the network apparatus includes a copy function, a printing function, a facsimile function, and a web function.

13. The apparatus of claim 12, further comprising:

a format analyzer configured to specify a client format of the client, and to compare the client format with the predetermined format to generate a comparison result;

a format converter configured to convert the client-specific device management data from the predetermined format to the client format based on the comparison result; and a data provider configured to provide the client-specific device management data converted by the format converter to the client.

14. A network apparatus connectable to a client through a network, comprising:

a processor;

a storage device configured to store a plurality of instructions which, when executed by the processor, cause the processor to:

store device management data indicating a result of performing at least one of a plurality of functions of the network apparatus in a data storage device;

store user authentication data, and at least one of authorized function data and authorized data type data, in a corresponding manner, for each one of registered users of the network apparatus, the authorized function data indicating at least one of the plurality of functions of the network apparatus that is authorized for operation by the corresponding one of the registered users and the authorized data type data indicating a type of the device management data stored in the data storage device which is allowed for access by the corresponding one of the registered users;

store an authentication indicator which indicates whether authentication is required by the network apparatus for the client to perform at least one of the plurality of functions of the network apparatus; and generate client-specific device management data when a request command which requests the network apparatus to provide client-specific device management data is received from a specific user at the client, wherein when the request command is received, the processor is further configured to determine whether authentication is required by the network apparatus based on the authentication indicator that is stored, and if the processor determines that authentication is not required, the processor obtains the device management data of the network apparatus stored in the data storage device and generates the client-specific device management data, in a predetermined format, based on the device management data of the network apparatus, and if the processor determines that authentication is required, the processor performs authentication of the specific user at the client and if the specific user is authenticated, extracts client-related information related to at least one of the plurality of functions of the network apparatus that is authorized for operation by the specific user at the client from the device management data stored in the data storage device using at least one of the authorized function data and the authorized data type data that corresponds to the specific user, and generates the client-specific device management data, in the predetermined format, based on the client-related information.

15. The network apparatus of claim 14, wherein the device management data stored in the data storage device includes device status data describing the current status of the network apparatus, wherein if the processor determines that authentication is not required, the processor obtains the device status data of the network apparatus from the device management data stored in the data storage device, and generates the client-specific device management data based on the device status data of the network apparatus, and wherein if the processor determines that authentication is required and the specific user at the client is authenticated, the processor extracts client-specific device status data that is related to at least one of the plurality of functions of the network apparatus that is authorized for operation by the specific user at the client from the device status data of the network apparatus stored in the data storage device, and generates the client-specific device management data based on the client-specific device status data of the network apparatus.

16. The network apparatus of claim 15, wherein the processor is further configured to determine whether the user authentication data for the specific user is provided with the request command, and request the client for the user authentication data if the user authentication data is not provided with the request command.

17. The network apparatus of claim 16, wherein the plurality of functions of the network apparatus includes a copy function, a printing function, a facsimile function, and a web function.

18. The network apparatus of claim 17, wherein the processor is further configured to:
  specify a client format of the client, and to compare the client format with the predetermined format to generate a comparison result;
  convert the client-specific device management data from the predetermined format to the client format based on the comparison result; and
  provide the client-specific device management data converted by the processor to the client.

19. A non-transitory computer readable medium tangibly embodying a program of instructions executable by a network apparatus to perform a data providing method, said data providing method comprising the steps of:
  storing device management data indicating a result of performing at least one of a plurality of functions of the network apparatus in a data storage device of the network apparatus;
  storing user authentication data, and at least one of authorized function data and authorized data type data, in a corresponding manner, for each one of registered users of the network apparatus, the authorized function data indicating at least one of the plurality of functions of the network apparatus that is authorized for operation by the corresponding one of the registered users and the authorized data type data indicating a type of the device management data stored in the data storage device which is allowed for access by the corresponding one of the registered users;
  storing an authentication indicator which indicates whether authentication is required by the network apparatus for the client to perform at least one of the plurality of functions of the network apparatus;
  generating, by a data generator of the network apparatus, client-specific device management data when a request command which requests the network apparatus to provide client-specific device management data is received from a specific user at the client; and
  determining, by a user authenticator of the network apparatus, whether authentication is required by the network apparatus based on the authentication indicator that is stored when the request command is received, wherein
  if the user authenticator determines that authentication is not required, the data providing method includes the steps of:
    obtaining, by the data generator, the device management data of the network apparatus stored in the data storage device; and
    generating, by the data generator, the client-specific device management data, in a predetermined format, based on the device management data of the network apparatus, and
  if the user authenticator determines that authentication is required, the data providing method includes the steps of:
    performing, by the user authenticator, authentication of the specific user at the client;
    extracting, by the data generator if the specific user is authenticated, client-related information related to at least one of the plurality of functions of the network apparatus that is authorized for operation by the specific user at the client from the device management data stored in the data storage device using at least one of the authorized function data and the authorized data type data that corresponds to the specific user; and
    generating, by the data generator, the client-specific device management data, in the predetermined format, based on the client-related information.

20. The non-transitory computer readable medium of claim 19, wherein the device management data stored in the data storage device includes device status data describing the current status of the network apparatus,
  wherein if the user authenticator determines that authentication is not required, the data providing method includes the steps of:
    obtaining, by the data generator, the device status data of the network apparatus from the device management data stored in the data storage device; and
    generating, by the data generator, the client-specific device management data based on the device status data of the network apparatus, and
  if the user authenticator determines that authentication is required, the data providing method includes the steps of:
    performing, by the user authenticator, authentication of the specific user at the client;
    extracting, by the data generator if the specific user is authenticated, client-specific device status data that is related to at least one of the plurality of functions of the network apparatus that is authorized for operation by the specific user at the client from the device status data of the network apparatus stored in the data storage device; and
    generating, by the data generator, the client-specific device management data based on the client-specific device status data of the network apparatus.

21. A network apparatus connectable to a client through a network, comprising:
  a storage device configured to store device management data, and user information including user authentication data, authorized function data, and authorized data type data for each one of registered users of the network apparatus, the authorized function data indicating at least one of a plurality of functions of the network apparatus that is authorized for operation by the corresponding one of the registered users and the authorized data type data indicating a type of the device management data accessible by the corresponding one of the registered users;

a command input configured to input a request command received from the client for requesting the network apparatus to provide client-specific device management data;

a user authenticator configured to determine whether authentication is required based on data type of the client-specific device management data requested by the request command, and to perform authentication of the client if the client-specific device management data requested by the request command includes a data type that requires authentication; and a data generator configured to generate client-specific device management data, in a predetermined format, wherein if the user authenticator determines based on the data type of the client-specific device management data requested by the request command that authentication is required and the client is authenticated, the data generator extracts client-related information related to a desired function performed by the client via the network apparatus from the device management data based on at least one of the authorized function data and the authorized data type data of the user information that corresponds to the user authentication data, and the data generator generates the client-specific device management data, in the predetermined format, based on the client-related information extracted by the user authenticator from the device management data, and wherein if the user authenticator determines based on the data type of the client-specific device management data requested by the request command that authentication is not required, the data generator obtains the device management data from the storage device and generates the client-specific device management data, in the predetermined format, based on the device management data.

22. The network apparatus of claim 21, wherein if the data type of the client-specific device management data requested by the request command is device status data describing a current status of the network apparatus, the user authenticator determines that authentication is not required, and the data generator obtains the device status data of the network apparatus from the device management data stored in the data storage device, and generates the client-specific device management data based on the device status data of the network apparatus.

23. The network apparatus of claim 21, wherein if the data type of the client-specific device management data requested by the request command is device log data describing activities or jobs performed by the network apparatus, the user authenticator determines that authentication is required and performs authentication of the specific user at the client, and if the specific user at the client is authenticated, the data generator extracts client-specific device log data that is related to at least one of the plurality of functions of the network apparatus that is authorized for operation by the specific user at the client from the device log data of the network apparatus stored in the data storage device, and generates the client-specific device management data based on the client-specific device log data of the network apparatus.

* * * * *